Oct. 29, 1968  F. B. SELLERS ET AL  3,408,496
ALPHA RAY EXCITED COMPOSITION ANALYSIS
Filed Nov. 23, 1964

INVENTORS
FRANCIS B. SELLERS
CHARLES A. ZIEGLER
BY
Weingarten, Orenbuch & Lahive
ATTORNEYS

United States Patent Office 3,408,496
Patented Oct. 29, 1968

3,408,496
ALPHA RAY EXCITED COMPOSITION ANALYSIS
Francis B. Sellers, Sudbury, and Charles A. Ziegler, Saxonville, Mass., assignors to Parametrics, Inc., a corporation of Massachusetts
Filed Nov. 23, 1964, Ser. No. 413,174
2 Claims. (Cl. 250—83.3)

ABSTRACT OF THE DISCLOSURE

A system for determining the elemental composition of a material. Alpha particles are used to excite the characteristic X-rays from the material and a detector which can discriminate between different energy levels is used to provide an output indication of the quantity of X-rays which are characteristic of specific elements.

---

Figure 1:
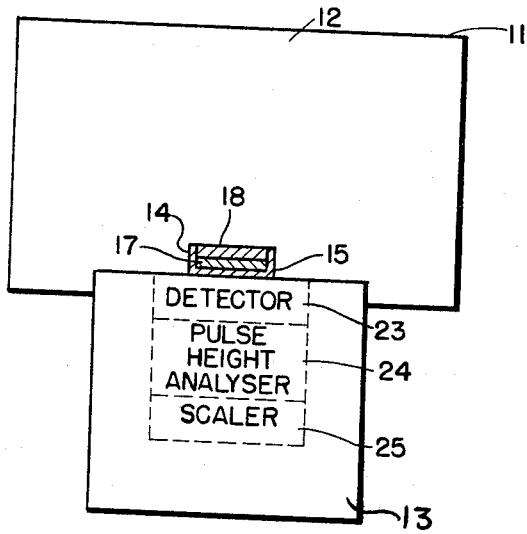

This invention relates in general to composition analysis and more particularly to a method and means for determining the elemental composition of a material by excitation of the characteristic X-rays by alpha rays.

There are many fields in which the analysis of a material to determine its component elements or to determine the amount of a specific elemental component within it have been widely used. One non-destructive technique which has been extensively used and which produces results essentially independent of ambient conditions such as temperature, vibration and the like, is the X-ray fluorescent technique. In this technique, the medium to be analyzed is bombarded either with an electron beam or X-rays having a quantum energy above the absorption edge of the element which is to be identified. As a result of this bombardment, X-rays are emitted from the element with an energy characteristic of the particular element. However, under these circumstances, in addition to X-rays of this characteristic energy, X-rays at a variety of energies are also produced. In the case of X-ray bombardment this is because the X-ray source itself, normally produced by an X-ray tube, has an inherently broad energy band. In the case of electron beam bombardment, Bremsstrahlung radiation is produced as a result of the scattering of the electrons by the field of the nuclei within the material. This Bremsstrahlung radiation also covers a relatively wide band of energy. Under either type of bombardment this wide band X-ray spectrum creates a "noise" background which tends to mask the characteristic X-ray signal being sought. Such a background, therefore, imposes limitations upon the sensitivity with which an analysis to determine the amount of a particular element within a medium can be carried out. Stated otherwise, relatively extensive analytical equipment, such as crystal spectrometers and monochromators, must be used in order to analyze the spectrum sensitively and separate out the number of X-rays being produced at the particular characteristic energy. The necessity for such extensive auxiliary equipment necessarily limits the number of applications and the convenience of using this equipment under some circumstances. Thus, in instances where the equipment must be readily portable, and where a low electrical power requirement is advantageous, the extensive analytical equipment tends to rule out the use of this analytical method. Yet, such circumstances are often found in airborne applications where the instrumentation must be flown to relatively high altitudes to perform its analytical function.

It is, therefore, a primary object of the present invention to provide a method and means for analysis of a medium by excitation of characteristic X-rays in which no Bremsstrahlung radiation is generated and wherein the exciting source requires no electrical power.

It is another object of the present invention to provide a readily portable apparatus for analysis of a medium by measuring characteristic X-rays emitted by the elements within that medium.

It is still another object of the present invention to provide a method and means for analysis of material by exciting characteristic X-rays in which the only X-rays generated are those characteristic of the elements composing the medium of the material.

Broadly speaking, the system of the present invention uses a radioactive source of alpha particles to excite the characteristic X-rays of the medium to be analyzed. The impinging alpha particles excite the characteristic X-rays from the elements to be identified in the same fashion as do incident electrons. However, in this instance, no significant amount of continuous X-ray background is generated. In addition when the alpha source is formed of a radioactive element, such as Po–210, no electrical power is required to be introduced within the system in order to generate the characteristic X-rays from the material. Where the medium consists of several elements the characteristic X-rays will be excited from all of the elements, and hence equipment for segregating energies characteristic of one material from those characteristic of another material is required in order to measure the relative amounts of elemental materials within the medium.

Figure 2:
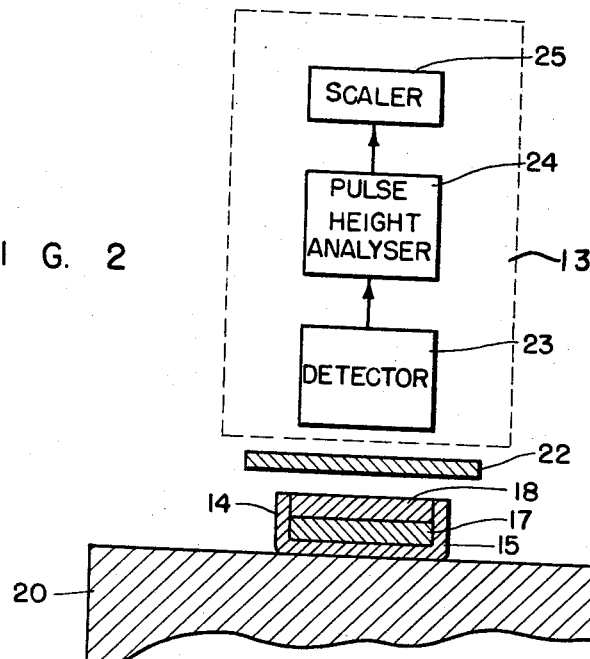

Other objects and advantages will become apparent from the following description when taken in conjunction with the accompanying drawing in which:

FIG. 1 is a generally schematic diagram of one preferred embodiment of an analysis system in accordance with the principles of this invention; and FIG. 2 is a schematic diagram of a second preferred embodiment of an analysis system constructed in accordance with the principles of this invention.

With reference now to FIG. 1, a chamber 11 is shown enclosing a gaseous medium 12 to be analyzed. Mounted on the bottom wall of chamber 11 is an X-ray detection system 13 on which is in turn positioned a radiation source 14. The radiation source 14 includes a shielding element 15 formed generally as a cup and this shielding element contains the radioactive material 17. Typically, the radioactive material 17 could be formed of an alpha emitter such as Po–210. The radioactive material 17 is disposed within the cup element 15 such that the alpha radiation is emitted at the open portion of the cup while the material of the cup 15 shields the alpha radiation from impinging on materials in other directions. A thin membrane 18 such as gold or platinum foil stretched across the open portion of the cup 15 seals the alpha source in. The X-ray detection system 13 consists, in a typical example, of a scintillating crystal and photomultiplier combination 23 as the primary detector with the output of this combination connected to pulse height analyzer 24 which can be adjusted to provide output indications on a scaler 25 of the number of pulses within certain specific heights generated by the detector. In this type of detector, the pulse height is proportional to the energy of the incident X-rays and hence the output from the pulse height analysis equipment is indicative of the number of X-rays received at each energy level. In such a system a proportional counter tube may be substituted for the scintillating crystal and photomultiplier combination, since this latter device also provides output pulses proportional to the energy of the incident X-rays. Alternatively, the X-ray detector can consist of a group of detectors each of which responds selectively to X-rays within a particular energy range. One such system is constituted by a group of Geiger counters each filled with a different gas or in which the window materials or the geometries are each different.

In the system described in FIG. 1, the alpha rays transmitted through the covering foil 18 retain sufficient energy (typically, for Po–210 covered with a .17 mil platinum, a spectrum between 0 and 2 mev.) to excite characteristic X-rays of any element. One limiting factor in the effective use of this device is, therefore, the number of and type of constituents of the medium to be analyzed. But, if the medium is formed of only a few constituents or of constituents whose characteristic X-ray energies are widely separated, then the system described in FIG. 1 provides an efficient analytical tool. It is perhaps most useful in determining the amount of a specific component within a medium, particularly where that component has a characteristic X-ray energy which differs widely from the characteristic X-rays of the remainder of the medium.

If it is desired to analyze a specific solid material under controlled conditions, for instance in a vacuum or in the presence of a particular gas, then a sample of the material in solid form contained on a backing plate or other convenient positioning structure may be positioned within the chamber 11 illustrated in FIG. 1.

Referring now to FIG. 2 a second configuration of the component elements shown in FIG. 1 is illustrated. In the embodiment of FIG. 2, like numbers refer to like parts of FIG. 1. In the configuration shown in FIG. 2 the radiation source 14 is shown mounted beneath the radiation detection system 13 on a single base member 20. In this embodiment there is no enclosing chamber and the system, therefore, can be used to analyze the ambient medium within which the detection system is existing. The medium to be analyzed can include either a gaseous medium as generally illustrated in FIG. 1 or a solid material such as slab 22. The X-ray detection system can be located, as illustrated, on the side of the medium to be analyzed that is opposite the source, provided, of course, that this medium is thin enough to transmit its own characteristic radiation. If it is not, then the geometry illustrated in FIG. 1 can be used in which the X-rays are detected on the same side of the medium that the alpha particles enter. Again in the configuration illustrated in FIG. 2, the radiation source 14 is formed from an alpha emitting material and the X-ray detector may take any one of the forms described in conjunction with FIG. 1.

The practical achievable efficiency of a system as illustrated in FIGS. 1 and 2 depends upon the X-ray yield from alpha excitation in comparison to the gamma ray "noise" background produced. It can be shown that for excitation of characteristic X-rays by alpha particle bombardment, the yield of X-rays is about four times the yield produced by bombardment with protons having a range equal to that of the alpha rays. It has been found from studies of proton bombardment that the number of gamma rays or particles produced in the target is less than 10⁻⁴ times the number of characteristic X-rays produced. With isotopes such as Po–208 or Po–210 the number of gamma rays produced in the source itself is less than 10⁻⁴ times the number of alpha rays emitted.

It has been experimentally determined that the number of characteristic K X-rays emitted from an aluminum target is 0.35 microcuries per millicurie of 1 mev. alphas, where the efficiency of coupling of alphas to the medium is 0.5. The efficiency of coupling is essentially the solid angle of the medium as viewed from the source divided by $4\pi$ steradians. The number of X-rays emitted increases rapidly if the alpha energy is increased. It can be calculated, based on the above experimental result, that if the energy of the alphas is raised to 5 mev. with other conditions unchanged, a yield of 90 microcuries of X-ray per millicurie of alpha source strength would be obtained. The ratio then of gamma rays from the target or source which constitute a background noise to the K X-rays produced under these conditions is .00021 to 1. Such a signal-to-noise ratio allows a highly sensitive measurement of the quantity of the characteristic X-ray producing element.

While the above embodiments of the invention have discussed alpha ray emitting radioisotopes, it is apparent that the characteristic X-ray may also be excited by helium nuclei accelerated in a particle accelerating machine, that is, non-radioisotope emitted alpha rays. Having described the invention, various modifications and improvements will now occur to those skilled in the art and the invention should be construed as limited only by the spirit and scope of the appended claims.

What is claimed is:

1. Apparatus for the analysis of the elemental composition of a medium, comprising a source of alpha rays positioned to impinge emitted alpha rays onto said medium, an X-ray detector positioned to receive X-rays emitted from that portion of said medium on which said alpha rays impinge, said X-ray detector providing as an output an indication of the number of received X-rays at energy levels corresponding to the characteristic X-rays of the elements composing said medium, and wherein said source of alpha rays is substantially free from electromagnetic radiation at energy levels which are indistinguishable at said detector from the energy levels corresponding to said characteristic X-rays.

2. Apparatus for determining the quantity of a selected elemental component within a medium comprising a source of alpha rays positioned to impinge emitted alpha rays onto said medium, an X-ray detector positioned to receive X-rays emitted from that portion of said medium on which said alpha rays impinge, said X-ray detector providing an output signal indicative only of said quantity of received X-rays having an energy equal to any particular characteristic X-ray energy of said selected elemental components, and wherein said source of alpha rays is substantially free from electromagnetic radiation at an energy level which is indistinguishable at said detector from said particular characteristic X-ray energy.

References Cited

UNITED STATES PATENTS

| | | | |
|---|---|---|---|
| 2,939,012 | 5/1960 | Scherbatskoy | 250—71.5 X |
| 2,998,524 | 9/1961 | Friedman | 250—106 |
| 3,154,681 | 10/1964 | Ziegler | 250—83.3 X |
| 3,193,680 | 7/1965 | Anderson | 250—83.3 |

ARCHIE R. BORCHELT, *Primary Examiner.*